United States Patent
Huang et al.

(10) Patent No.: US 12,486,489 B2
(45) Date of Patent: Dec. 2, 2025

(54) **CULTURE MEDIUM FOR TESTING DRUG RESISTANCE OF *H.PYLORI* AS WELL AS PREPARATION METHOD AND USE THEREOF**

(71) Applicant: YOUJIANG MEDICAL UNIVERSITY FOR NATIONALITIES, Guangxi (CN)

(72) Inventors: Yanqiang Huang, Guangxi (CN); Zansong Huang, Guangxi (CN); Aixing Guan, Guangxi (CN); Ganrong Huang, Guangxi (CN); Xiangkun Qin, Guangxi (CN)

(73) Assignee: YOUJIANG MEDICAL UNIVERSITY FOR NATIONALITIES, Guangxi (CN)

( * ) Notice: Subject to any disclaimer, the term of this patent is extended or adjusted under 35 U.S.C. 154(b) by 363 days.

(21) Appl. No.: 18/308,673

(22) Filed: Apr. 27, 2023

(65) Prior Publication Data
US 2024/0174973 A1  May 30, 2024

(30) Foreign Application Priority Data

Nov. 30, 2022 (CN) .......................... 202211524699.2

(51) Int. Cl.
*C12N 1/20* (2006.01)
(52) U.S. Cl.
CPC ............ *C12N 1/20* (2013.01); *C12N 2500/10* (2013.01); *C12N 2500/35* (2013.01); *C12N 2500/84* (2013.01); *C12N 2503/02* (2013.01)
(58) Field of Classification Search
CPC ...................................................... C12N 1/20
See application file for complete search history.

(56) References Cited

FOREIGN PATENT DOCUMENTS

| CN | 103757088 | 4/2014 |
|---|---|---|
| CN | 112080445 | 12/2020 |
| CN | 112683893 | 4/2021 |

*Primary Examiner* — Albert M Navarro
(74) *Attorney, Agent, or Firm* — JCIPRNET

(57) ABSTRACT

A culture medium for testing drug resistance of *H. pylori* as well as a preparation method and use thereof are characterized in that 10% to 15% of calf serum, 1.2 mg/mL to 2.4 mg/mL of urea, 0.004 mg/mL to 0.016 mg/mL of phenol red, 10 μmol/L to 100 μmol/L of nickel chloride and *H. pylori* selective additive accounting for 1% of the total volume of the culture medium are added on the basis of a Columbia culture medium, and meanwhile, antibiotics for testing drug resistance are added, and the pH value is adjusted to 7.15 to 7.35. The present invention provides a method for a rapid testing of *H. pylori* resistance in culture media.

6 Claims, 9 Drawing Sheets a: without antibiotic
b: with levofloxacin
c: with clarithromycin
d: with metronidazole
e: with amoxicillin
f: Cloumbia culture medium a: without antibiotic
b: with levofloxacin
c: with clarithromycin
d: with metronidazole
e: with amoxicillin
f: Cloumbia culture medium a: without antibiotic
b: with levofloxacin
c: with clarithromycin
d: with metronidazole
e: with amoxicillin
f: Cloumbia culture medium a: without antibiotic
b: with levofloxacin
c: with clarithromycin
d: with metronidazole
e: with amoxicillin
f: Cloumbia culture medium a: without antibiotic
b: with levofloxacin
c: with clarithromycin
d: with metronidazole
e: with amoxicillin
f: Cloumbia culture medium a: without antibiotic
b: with levofloxacin
c: with clarithromycin
d: with metronidazole
e: with amoxicillin
f: Cloumbia culture medium a: without antibiotic
b: with levofloxacin
c: with clarithromycin
d: with metronidazole
e: with amoxicillin
f: Cloumbia culture medium Medium Preparation a: Columbia culture medium, Calf serum, urea solution, phenol red solution, nickel chloride solution, pH regulator
b: levofloxacin 0.5 μg/Ml
c: clarithormycin 0.5 μg/mL
d: metronidazole 4 μg/mL
e: amoxicillin 0.0625 μg/mL A: without antibiotic
B: with levofloxacin
C: with clarithromycin
D: with metronidazole
E: with amoxicillin
F: Cloumbia culture medium Sample Treatment biopsy → Crush+suspension → Spot plate(5 pieces) → Cultivation (36h)

Result Observation (without HP growth)   (sensitive to HP)   (resistance to HP)

FIG. 14

CULTURE MEDIUM FOR TESTING DRUG RESISTANCE OF *H.PYLORI* AS WELL AS PREPARATION METHOD AND USE THEREOF

CROSS-REFERENCE TO RELATED APPLICATION

This application claims the priority benefit of China application serial no. 202211524699.2, filed on Nov. 30, 2022. The entirety of the above-mentioned patent application is hereby incorporated by reference herein and made a part of this specification.

BACKGROUND

Technical Field

The present invention belongs to the field of medicine and health, and in particular to a culture medium for testing drug resistance of *Helicobacter pylori* (*H. pylori*) as well as a preparation method and use thereof.

Description of Related Art

*H. pylori* is a microaerobic gram-negative bacterium with a population infection rate of approximately 50%, which can cause various diseases such as gastritis, gastric ulcer, gastric cancer, lymphoma, which pose a serious threat to the human health. Currently, clinical guidelines recommend the treatment for *H. pylori* as a quadruple therapy (PPI+bismuth+two kinds of antibiotics). Common antibiotics available include amoxicillin, clarithromycin, metronidazole, levofloxacin and the like. However, with the widespread use of antibiotics, the resistance of *H. pylori* has become increasingly severe, especially to metronidazole and clarithromycin, with resistance rates as high as 70% and 37%, and the rate of metronidazole resistance is even up to 90% in some regions. This has led to a lower and lower eradication rate of *H. pylori*, and antibiotic resistance is the main reason for patients' single or multiple eradication treatment failures. In order to deal with the increasingly severe challenge of drug resistance, it is necessary to guide the clinical rational drug use through the drug sensitivity testing.

Currently, the main methods for testing *H. pylori* resistance are traditional bacterial culture and drug resistance gene testing. However, the bacterial culture method has harsh conditions and a long cycle, requiring approximately 9 days to 12 days for testing, which would easily delay the treatment opportunity of patients. In addition, it has been reported in the literature that *H. pylori* in human biopsy specimens is prone to spherical changes and other changes after subculture for 3-5 generations, making it difficult to test the characteristics of "in situ" *H. pylori* and prone to result in deviation. The traditional culture method is prone to pollution, which is also a prominent problem. Considering these adverse factors, the traditional drug resistance testing is not widely carried out in clinical practices, and only a few qualified hospitals or scientific research institutions carry out this drug sensitivity testing. *H. pylori* resistance gene testing methods include digital chip, PCR, and other technologies. The testing specimens are diverse, which can be gastric mucosa or feces. The characteristics are rapid and sensitive. However, there are cases where the genotype and phenotype of resistance genes are not completely consistent. Only a small number of known and well researched resistance genes can be tested, such as the levofloxacin resistance gene gryA, clarithromycin resistance genes A2142G, A2143G. There are still some drug resistance genes that have not discovered or have not been tested, and the testing results cannot fully represent the actual results. Moreover, the requirements for genetic testing equipment are relatively high and the cost is relatively high, so the scope of promotion and application is small. Therefore, it is significant to explore a rapid, effective, low-cost, and easily popularized method for testing *H. pylori* resistance.

In order to quickly determine whether *H. pylori* in the stomach is resistant to drugs, some researchers have improved traditional testing methods. The biopsy specimen is directly coated on a solid medium containing antibiotics. When *H. pylori* grows, it can be determined that *H. pylori* produces drug resistance in the stomach. However, the prerequisite for this testing method is that the biopsy specimen must have $1\times10^6$ CFU/mL of bacterial. In fact, it is difficult to achieve this bacterial count in biopsy specimens, resulting in false negative results. Moreover, the cycle of this testing method is 3 days to 5 days, which is relatively time-consuming. In order to increase the bacterial count of *H. pylori* in biopsy specimens, centrifugation, concentration, and resuspension after fragmentation of the biopsy tissue can effectively increase the initial bacterial count of inoculation. In order to enable the testing results of this culture method to be more accurate, a MIC value at a bacterial count of $1\times10^6$ CFU/mL is explored, and based on the MIC value of *H. pylori* resistance determined by NICSL and (or) CLSI (bacterial count is $1\times10^6$ CFU/mL), the resistance breakpoint at *H. pylori* bacteria amount of $1\times10^6$ CFU/mL is calculated. At the same time, the accuracy of the estimated breakpoint is repeatedly verified with different standard strains and clinical strains in the laboratory. Combined with the clinical method of rapid urease testing to determine the presence of *H. pylori*, without affecting the growth of *H. pylori*, phenol red, urea, nickel and chloride are added to the solid culture in Colombia, and the pH value is adjusted, resulting in a significant discoloration reaction (localized purplish red) in the final solid culture medium. After culturing the biopsy specimens for 36 hours, it is possible to test whether *H. pylori* is resistant to amoxicillin, clarithromycin, metronidazole, and levofloxacin based on the discoloration reaction of the culture medium.

To verify the reliability of this method, 100 μL of each biopsy specimens is taken simultaneously and coated on Columbia medium and cultivated in a three gas incubator at 37° C. for 72 hours to determine the initial bacterial count of the specimen, and the MIC is tested using traditional methods. Results show that the conclusion of the traditional drug sensitivity testing method and the method of the present invention in determining bacterial resistance is consistent with each other.

After coated with biopsy tissue, the solid culture medium prepared by the method of the present invention is placed in a three gas incubator at a constant temperature of 37° C. and cultivated for 36 hours. After being taken out, the solid culture medium is left to stand in a natural environment for 30 minutes. Based on the colour reaction results of the solid culture medium, it is possible to determine whether the bacteria have developed drug resistance. This testing method is faster than traditional methods, with a good accuracy and low equipment requirements, which has a great application value for testing *H. pylori* resistance, and is suitable for widespread promotion and use at the grassroots level.

SUMMARY

Technical problems to be solved: in order to improve the timeliness and accuracy of clinical test for *H. pylori* resistance, the present invention provides a method for a rapid testing of *H. pylori* resistance in culture media, which can obtain the drug resistance testing results within 36 hours, significantly shortens the time of the drug sensitivity testing, has a high accuracy and a low cost, and is suitable for being widely popularized and used at the grassroots level.

Technical solutions: a culture medium for testing drug resistance of *H. pylori*, the composition is on the basis of a Columbia culture medium, with an addition of calf serum accounting for 10 wt. % to 15 wt. % of the culture medium, 1.2 mg/mL to 2.4 mg/mL of urea, 0.004 mg/mL to 0.016 mg/mL of phenol red, 10 μmol/L to 100 μmol/L of nickel chloride and *H. pylori* selective additive accounting for 1% of the total volume of the culture medium, and meanwhile antibiotics for testing drug resistance are added, and the pH value is adjusted to 7.15 to 7.35.

Preferably, the composition that the Columbia culture medium is 4 g, the calf serum is 14 mL, the urea is 160 mg, the *H. pylori* selective additive (Dent 'SR0147E) is 1 mL, the phenol red is 0.8 mg, and the nickel chloride is 10 μmol, is added by sterile water is to form a 100 mL system, and the pH regulator is 5 wt. % sodium hydroxide solution.

Preferably, the antibiotics are 0.5 μg/mL levofloxacin, 0.5 μg/mL clarithromycin, 4 μg/mL metronidazole, or 0.0625 μg/mL amoxicillin.

Preferably, the pH value of the culture medium is 7.35.

Provided is a method for preparing the culture medium, and the steps are as follows. The Columbia culture medium is weighed, added with pure water, then cooled to 50° C. naturally after autoclave sterilization, and added with calf serum, 20 wt. % sterile urea solution, *H. pylori* selective additive, 0.2 wt. % phenol red solution, nickel chloride, the pH of the culture medium is adjusted to 7.35 by using a 5 wt. % sodium hydroxide solution titration method, then the culture medium is added with resistance testing antibiotics, and the plate is inverted before the culture medium coagulates, with 10 mL/piece.

Provided is a use of the culture media in the preparation of products for testing drug resistance of *H. pylori*.

Beneficial effects: firstly, the present invention can quickly test the drug resistance of *H. pylori* using a culture medium, and the results can be obtained within 36 hours, with a significantly better timeliness than traditional drug sensitive culture; secondly, the culture medium selected in the present invention clarifies the requirements for the amount of bacteria in biopsy specimens, and the results are more accurate and intuitive than the current methods for testing *H. pylori* resistance using the solid culture media; thirdly, the present invention directly tests the drug resistance phenotype of *H. pylori*, eliminating the false negative problem caused by inconsistent genotype and phenotype, and gene mutations during drug resistance gene testing; fourth, the testing method provided by the present invention has low equipment requirements, a low cost of culture media, and is easy to operate, which can be widely popularized and used at the grassroots level, and has a good guiding role in the rational use of antibiotics in the clinical treatment of *H. pylori* infection.

BRIEF DESCRIPTION OF THE DRAWINGS

FIG. 14 illustrates an operational flow chart for testing drug resistance of *H. pylori*.

DESCRIPTION OF THE EMBODIMENTS

1. Preparation of Characteristic Culture Medium

Figure 1:
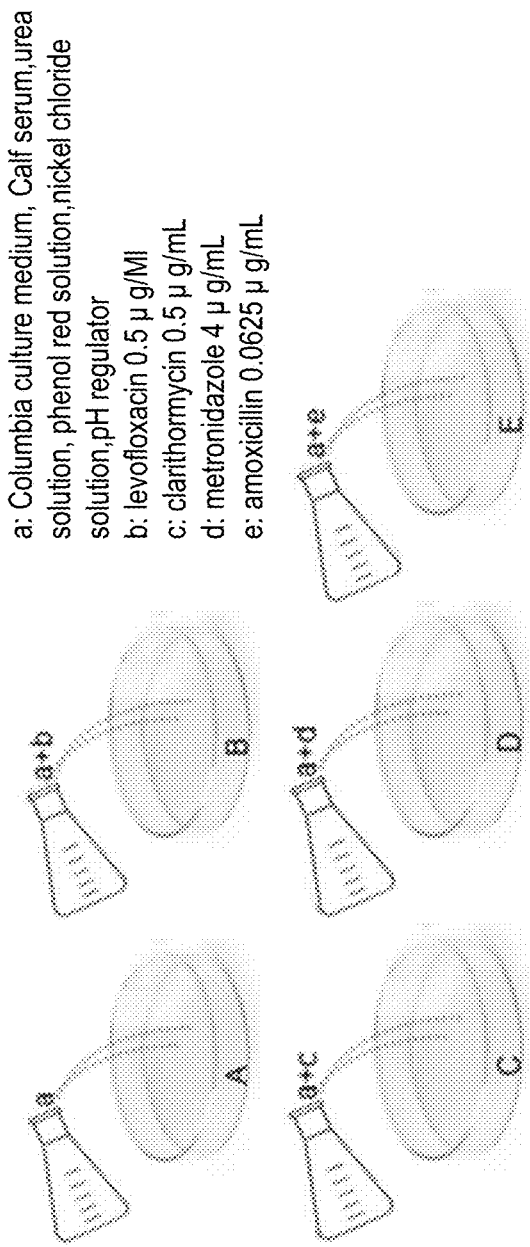
FIG. 1 illustrates a schematic diagram of a preparation of a solid culture medium for testing drug resistance of *H. pylori*.

In Step 1, 10 mL of 0.2 wt. % phenol red solution is prepared, sterilized in a high-pressure sterilization pot for 30 minutes, and stored for the subsequent use after cooling to the room temperature; 50 mL of 20 wt. % urea solution is prepared, 10 mL of 5 wt. % NaOH solution is prepared, 10 mL of 100 mmol/L $NiCl_2$ solution is prepared, and all prepared solutions are stored at −20° C. for the subsequent use after filtering and sterilizing. In Step 2, 4.0 g of Columbian culture medium is weighed and poured into a triangular flask with 84 mL of pure water, mixed well, sealed, and then sterilized in a high-pressure sterilizer for 30 minutes, and the Columbian culture medium is cooled to approximately 55° C. for the subsequent use. In Step 3, 400 μL of 0.2% phenol red solution, 14 mL of calf serum, 1 mL of *H. pylori* selective additive, and 5% NaOH solution are added in Colombian culture medium at around 55° C. in sequence, the pH is adjusted to 7.35, which is thoroughly mixed and shaken to prepare the culture medium a. In Step 4, 0.5 µg/mL of levofloxacin is added to the culture medium a to prepare the characteristic medium b, 0.5 g/mL of clarithromycin is add to the culture medium a to prepare the characteristic medium c, 4 g/mL of metronidazole is added to the culture medium a to prepare the characteristic medium d, and 0.0625 µg/mL of amoxicillin is added to the culture medium a to prepare the characteristic culture medium e. In Step 5, after the liquid culture media a, b, c, d, and e cool to around 45° C., 800 µL of 20% sterile urea solution and 100 µL of 100 mmol/L NiCl$_2$ solution are quickly added and fully mixed well. In Step 6, the mixed liquid culture media a, b, c, d, and e are quickly poured into a petri dish, approximately 10 mL/piece, to prepare the characteristic solid culture media A, B, C, D, and E for the rapid testing of *H. pylori* resistance and marked accordingly for the subsequent use.

2. Specimen Acquisition and *H. pylori* Culture

The patient is inquired about the medical history and patient cases that have not used antibiotics or other drugs recently or have stopped using antibiotics for 4 weeks or proton pump inhibitors for 2 weeks are selected. The patient is diagnosed as positive for *H. pylori* through a $^{13}$C breath test, after obtaining the patient's informed consent and signing an informed consent form, one biopsy tissue group is obtained from a gastric antrum and a small curvature side of the gastric body through a gastroscopy biopsy passage. After homogenization with a homogenizer, centrifugation, concentration, and resuspension, specimen suspensions containing *H. pylori* are obtained, and four groups of 10 µL suspension is separately taken and dropped onto the characteristic culture media A, B, C, D, and E respectively, and placed the characteristic culture media in a three gas (85% nitrogen, 10% carbon dioxide, 5% oxygen) incubator at 37° C. for 36 hours. The experimental results are observed. Another 100 µL specimen suspension is taken and coated in Columbia solid culture medium and cultivated for 72 hours to count the initial bacterial count of the specimen, single colonies are isolated, bacteria are increased, and eventually the MIC of clinical specimens are tested by using a micro dilution method to verify the consistency of the two methods in determining the results.

3. Observations

The characteristic culture media (A, B, C, D, E) are cultivated at a constant temperature of 37° C. for 36 hours in a three gas incubator. The characteristic culture media are removed and placed in a natural environment for 30 minutes to observe whether there are discolorations at the point of the culture medium where the specimen is dropped in. When no discolorations in the characteristic culture media ABCDE, it is determined that there is no growth of *H. pylori*; when the characteristic culture medium A locally turns red but no discolorations in the characteristic culture media BCDE, it is determined that *H. pylori* in the specimen is sensitive to levofloxacin, clarithromycin, metronidazole, and amoxicillin; when the characteristic culture medium A locally turns red and any piece of the culture medium in BCDE turns red at the same time, it is determined that *H. pylori* in the specimen is resistant to the antibiotics contained in the discoloured culture medium (B contains levofloxacin, C contains clarithromycin, D contains metronidazole, and E contains amoxicillin). Another 100 µL of the specimen is taken and coated on Columbia solid culture medium and cultivated in a three gas incubator at a constant temperature of 37° C. for 3 days to 5 days. The number of colonies on the plate is counted to determine the initial inoculation amount. The micro dilution method is adopted to test the MIC of clinical specimen *H. pylori*, the test is meaningful only when there is no bacterial growth in the negative control well without bacteria and there is bacterial growth in the positive well with bacteria but without antibiotics. The minimum drug concentration that completely inhibits bacterial growth is taken as the MIC. The results are recorded and whether the micro dilution method and characteristic culture medium are consistent with each other in evaluating the drug resistance of clinical *H. pylori* strains is compared.

Example 1

1. Culture Medium Preparation

Based on Columbia culture medium, supplemented with urea, phenol red, *H. pylori* selective additives, sodium hydroxide, nickel chloride, selective antibiotics, added with sterile water, a system with a total volume of 100 mL is prepared. The specific formula is as follows:
Columbia culture medium 4 g,
Calf serum 14 mL,
20% urea solution 800 µL,
0.2% phenol red solution 400 µL,
100 mmol/L nickel chloride solution 100 µL,
*H. pylori* selective additive (Dent, SR0147E) 1 mL,
5% sodium hydroxide solution, adjusting the pH to 7.35,
Selective antibiotics include 0.5 µg/mL levofloxacin, 0.5 µg/mL clarithromycin, 4 µg/mL metronidazole and 0.0625 µg/mL amoxicillin, respectively.

In Step 1, 10 mL of 0.2 wt. % phenol red solution is prepared, sterilized in a high-pressure sterilization pot for 30 minutes, and stored for the subsequent use after cooling to the room temperature; 50 mL of 20 wt. % urea solution is prepared, 10 mL of 5 wt. % NaOH solution is prepared, and 10 mL of 100 mmol/L NiCl$_2$ solution is prepared, and all prepared solutions are stored at −20° C. for the subsequent use after filtering and sterilizing.

In Step 2, 4.0 g of Columbian culture medium is weighed and poured into a triangular flask with 84 mL of pure water, mixed well, sealed, and then sterilized in a high-pressure sterilizer for 30 minutes, and the Columbian culture medium is cooled to approximately 55° C. for the subsequent use.

In Step 3, 400 µL of 0.2% phenol red solution, 14 mL of calf serum, 1 mL of *H. pylori* selective additive and 5% NaOH solution are added in Colombian culture medium at around 55° C. in sequence. The pH is adjusted to 7.35, which is thoroughly shaken to prepare the culture medium a.

In Step 4, 0.5 g/mL levofloxacin is added to the culture medium a to prepare characteristic culture medium b, 0.5 µg/mL clarithromycin is added to culture medium a to prepare characteristic culture medium c, 4 µg/mL metronidazole is added to culture medium a to prepare characteristic culture medium d, and 0.0625 µg/mL amoxicillin is added to culture medium a to prepare characteristic culture medium e.

In Step 5, after the culture media a, b, c, d, and e cool to around 45° C., 800 µL of 20% sterile urea solution and 100 µL of 100 mmol/L NiCl$_2$ solution are quickly added then fully mixed well.

In Step 6, the mixed liquid culture meda a, b, c, d, and e are quickly poured into a petri dish, approximately 10 mL/piece, to prepare the characteristic solid culture media A, B, C, D, and E for the rapid testing of *H. pylori* resistance, and marked accordingly for the subsequent testing.

2. Specimen Acquisition and *H. pylori* Culture

In Step 1, the BHI is sterilized and cooled to the room temperature. 10% calf serum is added, then 30% glycerol and 1% *H. pylori* selective additive are added to prepare *H. pylori* transfer solution.

In Step 2, patient cases that have not used antibiotics or other drugs recently or have stopped using antibiotics for 4 weeks or stopped using proton pump inhibitors for 2 weeks are selected. The patient is diagnosed as positive for *H. pylori* through the $^{13}C$ breath test, the patient's informed consent is obtained and an informed consent form is signed.

In Step 3, a biopsy tissue group is obtained from the gastric antrum and a small curvature side of the gastric body through a gastroscopy biopsy passage and placed into an EP tube (strictly sterile operation).

In Step 4, the EP tube containing the biopsy tissue is placed in a homogenizer for crushing, centrifugation, concentration, and resuspension to produce a bacterial suspension.

In Step 5, 10 μL of suspension is added and taken dropwise to the characteristic culture medium (5 pieces in total), cultivated in a three gas incubator at 37° C. for 36 hours, and removed. The characteristic culture medium is placed for 30 minutes before interpreting the results.

Example 2

1. Culture Medium Preparation

Based on Brain Heart Infusion (BHI) agar medium, supplemented with urea, *H. pylori* selective additives, phenol red, sodium hydroxide, nickel chloride, selective antibiotics, and added with sterile water, a system with a total volume of 100 mL is prepared. The specific formula is as follows:
BHI agar medium 4 g,
Calf serum 14 mL,
20% urea solution 800 μL,
0.2% phenol red solution 400 μL,
100 mmol/L nickel chloride solution 100 μL,
*H. pylori* selective additive (Dent, SR0147E) 1 mL,
5% sodium hydroxide solution, adjusting the pH of to 7.35,
Selective antibiotics include 0.5 μg/mL levofloxacin, 0.5 μg/mL clarithromycin, 4 μg/mL metronidazole and 0.0625 μg/mL amoxicillin, respectively.

In Step 1, 10 mL of 0.2% phenol red solution is prepared, sterilized in a high-pressure sterilization pot for 30 minutes, and stored for the subsequent use after cooling to the room temperature; 50 mL of 20% urea solution, 10 mL of 5% NaOH solution is prepared, 10 mL of 100 μmol/L $NiCl_2$ solution is prepared, and all prepared solutions are stored at −20° C. for the subsequent use after filtering and sterilizing.

In Step 2, 4.0 g of Brain Heart Infusion (BHI) agar medium is weighed and poured into a triangular flask with 84 mL of pure water, mixed well, sealed, and then sterilized in a high-pressure sterilizer for 30 minutes, and then the Columbian culture medium is cooled to approximately 55° C. for the subsequent use.

In Step 3, 400 μL of 0.2% phenol red solution, 14 mL of calf serum, *H. pylori* selective additive, and 5% NaOH solution are added to BHI agar at around 55° C. in sequence, the pH is adjusted to 7.35, which is thoroughly shaken to prepare a mixed culture medium In Step 4, 0.5 μg/mL levofloxacin is added to the culture medium a to prepare the characteristic culture medium b, 0.5 g/mL clarithromycin is added to the culture medium a to prepare the characteristic medium c, 4 μg/mL metronidazole is added to the culture medium a to prepare the characteristic culture medium d, and 0.0625 μg/mL amoxicillin is added to the culture medium a to prepare the characteristic medium e.

In Step 5, after the mixed culture media a, b, c, d, and e are cooled to around 45° C., 800 μL of 20% sterile urea solution and 100 μL of 100 mmol/L $NiCl_2$ solution are quickly added, then fully mixed well.

In Step 6, the mixed liquid culture media a, b, c, d, and e are quickly poured into a petri dish, approximately 10 mL/piece, to form the characteristic solid culture media A, B, C, D, and E for the rapid testing of *H. pylori* resistance, and marked accordingly for the subsequent testing.

2. Specimen Acquisition and *H. pylori* Culture

In Step 1, the BHI medium is sterilized and cooled to the room temperature, 10% calf serum is added, then 30% glycerol and 1% *H. pylori* selective additive are added to prepare *H. pylori* transfer solution;

In Step 2, patient cases that have not used antibiotics or other drugs recently or have stopped using antibiotics for 4 weeks or stopped using proton pump inhibitors for 2 weeks are selected. The patient is diagnosed as positive for *H. pylori* through the $^{13}C$ breath test, the patient's informed consent is obtained and an informed consent form is signed.

In Step 3, a biopsy tissue group is obtained from the gastric antrum and a small curvature side of the gastric body through a gastroscopy biopsy passage and placed into an EP tube (strictly sterile operation).

In Step 4, the EP tube containing the biopsy tissue is placed in a homogenizer for crushing, centrifugation, concentration, and resuspension to produce a bacterial suspension.

In Step 5, 10 μL of suspension is added and taken dropwise to the characteristic culture medium (5 pieces in total), cultivated in a three gas incubator at 37° C. for 36 hours, and removed. The characteristic culture medium is placed for 30 minutes before interpreting the results.

Example 3

1. Culture Medium Preparation

Based on Columbia culture medium, supplemented with *H. pylori* selective additives, urea, phenol red, sodium hydroxide, nickel chloride, selective antibiotics, and water. The specific formula is as follows:
Columbia culture medium 4 g,
Calf serum 14 mL,
20% urea solution 800 μL,
0.2% phenol red solution 400 μL,
100 mmol/L nickel chloride solution 100 μL,
*H. pylori* selective additive (Dent, SR0147E) 1 mL,
5% sodium hydroxide solution, adjusting the pH to 7.35,
Selective antibiotics include 0.5 μg/mL levofloxacin, 0.5 μg/mL clarithromycin, 4 μg/mL metronidazole, and 0.0625 μg/mL amoxicillin, respectively.

In Step 1, 10 mL of 0.2% phenol red solution is prepared, sterilized in a high-pressure sterilization pot for 30 minutes, and stored for the subsequent use after cooling to the room temperature; 50 mL of 20% urea solution is prepared, 10 mL of 5% NaOH solution is prepared, and 10 mL of 100 μmol/L NiCl$_2$ solution is prepared, and all prepared solutions are stored at −20° C. for the subsequent use after filtering and sterilizing.

In Step 2, 2.0 g of Columbian culture medium is weighed and poured into a triangular flask with 42 mL of pure water, mixed well, sealed, and then sterilized in a high-pressure sterilizer for 30 minutes, then the Columbian culture medium is cooled to approximately 55° C. for the subsequent use.

In Step 3, 400 μL of 0.2% phenol red solution, 14 mL of calf serum, 100 μL of 100 mmol/L NiCl$_2$ solution, *H. pylori* selective additive, 5% NaOH solution are added in Colombian culture medium at around 55° C. in sequence, and the pH is adjusted to 7.35, which is thoroughly shaken to prepare a mixed culture medium.

In Step 4, 0.5 μg/mL levofloxacin, 0.5 μg/mL clarithromycin, 4 μg/mL of metronidazole, 0.0625 μg/mL of amoxicillin and the equal volume of PBS are added to the prepared culture medium (5 bottles), and marked with ABCDE.

In Step 5, after the mixed culture medium is cooled to approximately 45° C., 800 μL of 20% urea solution (sterile) is added quickly then fully mixed well.

In Step 6, the mixed culture medium is quickly poured into a petri dish, approximately 10 mL/piece, to form a solid culture medium for a rapid testing of *H. pylori* resistance, and marked for the subsequent testing.

2. Specimen Acquisition and *H. pylori* Culture

In Step 1, the BHI medium is to sterilized and cooled to the room temperature. 10% calf serum is added, then 30% glycerol and 1% *H. pylori* selective additive are added to prepare *H. pylori* transfer solution.

In Step 2, patient cases that have not used antibiotics or other drugs recently or have stopped using antibiotics for 4 weeks or stopped using proton pump inhibitors for 2 weeks are selected. The patient is diagnosed as positive for *H. pylori* through the $^{13}$C breath test, the patient's informed consent is obtained and an informed consent form is signed.

In Step 3, two biopsy tissue groups are obtained from the gastric antrum and a small curvature side of the gastric body through a gastroscopy biopsy passage and placed in an EP tube (strictly sterile operation).

In Step 4, the EP tube containing the biopsy tissue is placed in a homogenizer for crushing, centrifugation, concentration, and resuspension to produce a bacterial suspension.

In Step 5, 10 μL of suspension is added and taken dropwise to the characteristic culture medium (5 pieces in total), cultivated in a three gas incubator at 37° C. for 36 hours, and removed. The characteristic culture medium is placed for 30 minutes before interpreting the results.

Provided is the further detailed description of the culture medium, preparation method, and application example 1 for testing drug resistance of *H. pylori* in the present invention.

1. Materials 1.1 Specimens
  (1) Columbia culture medium, purchased from Chengdu Herbpurify Co., Ltd;
  (2) Calf serum, purchased from Chengdu Herbpurify Co., Ltd;
  (3) Urea, purchase of Shanghai Macklin Biochemical Co., Ltd;
  (4) Phenol Red, purchased from Shanghai yuanye Bio-Technology Co., Ltd;
  (5) Amoxicillin, clarithromycin, metronidazole and levofloxacin were purchased from Shanghai Macklin Biochemical Co., Ltd;
  (6) NaOH, purchase of Shanghai Macklin Biochemical Co., Ltd;
  (7) NiCl$_2$, purchase of Shanghai Macklin Biochemical Co., Ltd.

1.2 Strains

Sensitive *H. pylori* strains G27, 26695, and drug-resistant *H. pylori* strains 159, 161, 162, 163, 286, 287, 289, and 290 are all provided by the Research Center for the Prevention and Control of Drug Resistant Microbial Infections of Youjiang Medical University for Nationalities, and clinical strains are provided by the Affiliated Hospital of Youjiang Medical University for Nationalities.

1.3 Main culture medium and reagents: Columbia culture medium, sterile water, DMSO.

1.4 Main instruments: a three gas incubator, a centrifuge, an enzyme reader, an electronic balance, a ultraviolet spectrophotometer, a ultra clean workbench, a vortex oscillator, a homogenizer, a high-pressure sterilization pot, and the like.

1.5 Consumables: EP tubes, centrifuge tubes, inoculation rings, sterile plates, triangular bottles, micro gas production bags, and the like.

Figure 2:
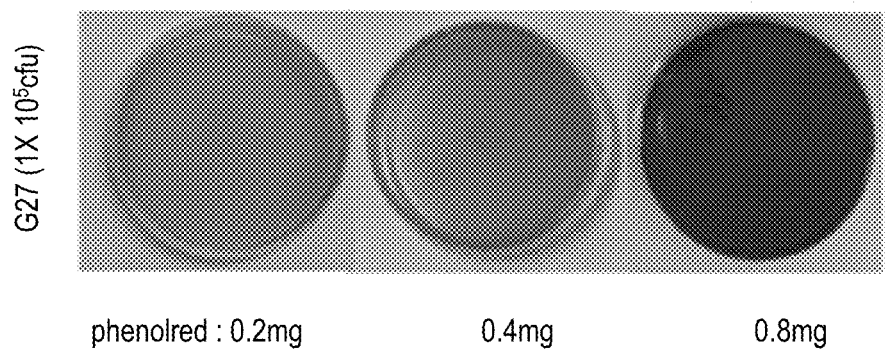
FIG. 2 illustrates a discoloration reaction of phenol red on *H. pylori* strain G27($1\times10^6$ CFU) after local coating and culture for 24 hours, under the premise of adding a definite dosage of urea to the Colombian culture medium.
Figure 3:
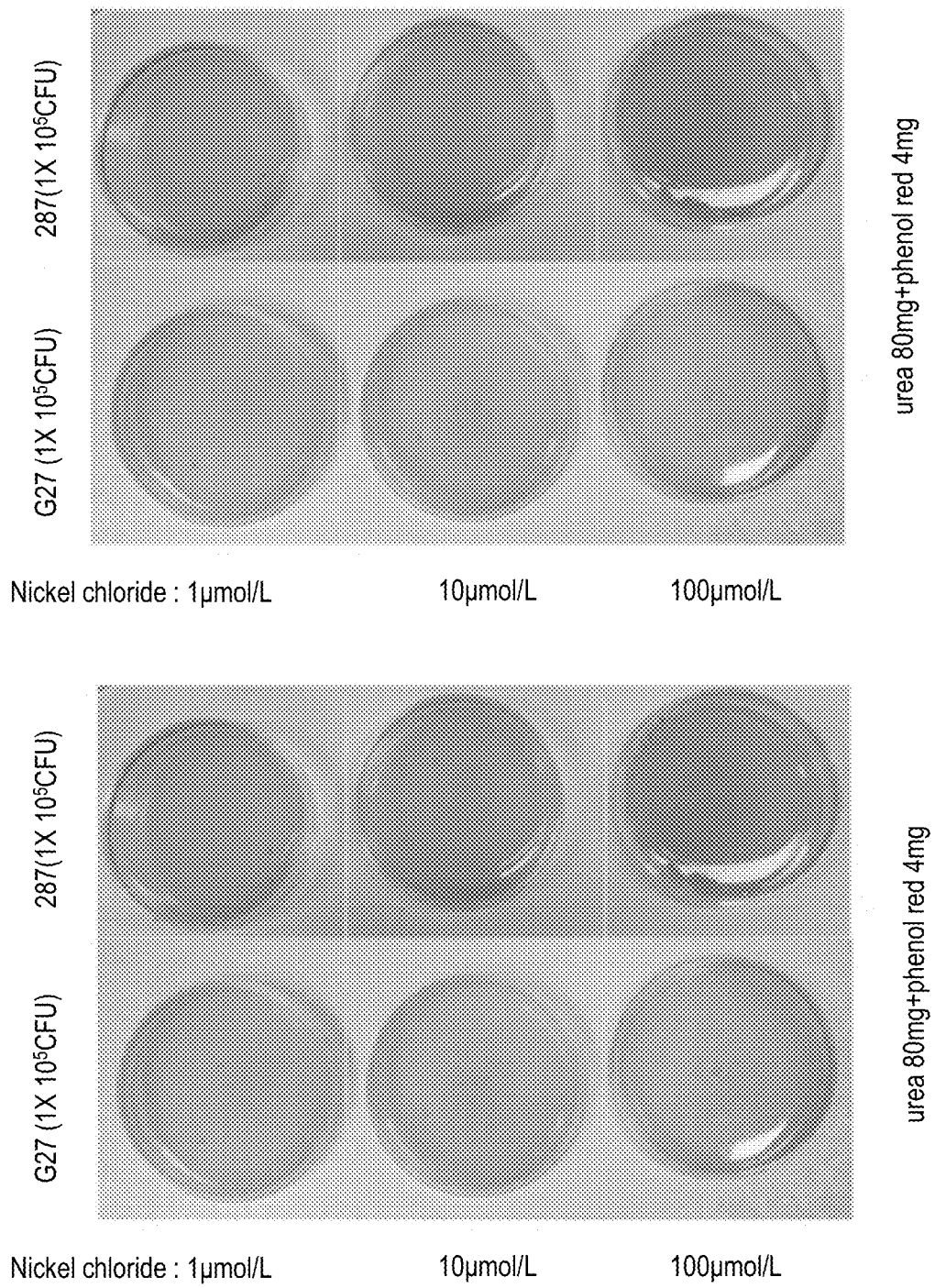
FIG. 3 illustrates a discoloration reaction of $NiCl_2$ on *H. pylori* strains G27 and 287 ($1\times10^6$ CFU) after local coating and culture for 24 hours, under the premise of adding definite dosages of urea and phenol red to the Colombian culture medium.

2. Method and Results 2.1 Effects of Various Components of Culture Medium on the Growth of *H. pylori*
  (1) Solution preparation: 10 mL of 0.2 wt % phenol red solution is prepared, sterilized in a high-pressure sterilization pot for 30 minutes, and stored for the subsequent use after cooling to the room temperature; 50 mL of 20 wt. % urea solution is prepared, 10 mL of 5 wt. % NaOH solution is prepared, and 10 mL of 100 μmol/L NiCl$_2$ solution is prepared, and all prepared solutions are stored at −20° C. for the subsequent use after filtering and sterilizing.
  (2) Preparation of rapid drug resistance solid culture medium: 2.0 g of Columbian culture medium is weighed and poured into a triangular flask with 42 mL of pure water, mixed well, sealed, sterilized in a high-pressure sterilization pot for 30 minutes, and the Columbian culture medium is cooled to approximately 55° C., and 7 mL of calf serum is added; 0.2% phenol red solution, 20% urea solution, 100 μmol/L NiCl$_2$ solution, and 5% NaOH solution are added respectively, the pH is adjusted to explore and discover the conditions for adding each component to the culture medium.
  (3) Preparation of bacterial solution: *H. pylori* (G27 and 287) grown in logarithmic phase
on a solid plate is taken to prepare a bacterial suspension by using BHI culture medium, and the concentration of the bacterial solution is adjusted to 1×10$^8$ CFU/mL (OD600 is 0.3), diluted 10 times for the subsequent use.
  (4) Bacterial liquid coating plate: 10 μL bacterial solution is taken and partially coated on the explored characteristic solid culture medium.
  (5) Bacterial culture: the coated characteristic culture medium is placed in a three gas incubator at 37° C. for 72 hours, and the growth of bacteria on the culture medium is observed.
  (6) Results: in 50 mL Colombian culture medium, 60 mg to 240 mg of urea is added separately, when the addition of urea is 60 mg, there is no effect on the growth of *H. pylori*; when the addition of urea is 120 mg to 240 mg, the growth is not good; when the amount of urea is 60 mg to 120 mg, the effects of 80 mg urea and 100 mg urea on *H. pylori* are further explored. It is ultimately found that the maximum value of added urea without affecting the growth of *H. pylori* is 80 mg. 0.2 mg to 0.8 mg of phenol red is added separately to 50 mL Colombian culture medium, which has no effect on the growth of *H. pylori*; however, when 80 mg of urea is added to the Colombian culture medium and 0.8 mg of phenol red is added, it has no effect on the growth of *H. pylori* and has the optimum identification, but the sensitivity is not good; when 80 mg of urea and 0.4 mg of phenol red are added to the Columbia culture medium simultaneously, it has no effect on the growth of *H. pylori* and has good identification and sensitivity; when 80 mg of urea and 0.2 mg of phenol red are added to the Colombian culture medium simultaneously, it has no effect on the growth of *H. pylori* but has poor identification and non-good sensitivity (see Table 1 and FIG. 2). On the basis of adding 80 mg of urea and 0.4 mg of phenol red to the Colombian culture medium, the pH value is adjusted, it is found that *H. pylori* can grow and discolorations more significantly at a pH of 7.15 to 7.35. On this basis, 1 μMol/L to 200 μMol/L of $NiCl_2$ is added, the sensitivity and identification of the discoloration reaction are further improved, the recognition of the discoloration reaction with 100 μmol/L of $NiCl_2$ has reached its maximum (see Table 2 and FIG. 3).

(7) Conclusion: the optimal formula for producing a total system of 100 mL special culture medium is 4 g of Colombian culture medium, 14 mL of calf serum, 160 mg of urea, 0.8 mg of phenol red, and 10 μMol of nickel chloride, the optimal pH value is 7.35.

TABLE 1

Effects of urea and phenol red on *H. pylori* on Columbia culture medium

| strains | Urea (mg) | | | | | Phenol red (mg) | | |
|---|---|---|---|---|---|---|---|---|
| | 60 | 80 | 100 | 120 | 240 | 0.2 | 0.4 | 0.8 |
| G27 | ++ | ++ | + | + | − | Δ | ΔΔ | ◇ |
| 26695 | ++ | ++ | + | + | − | Δ | ΔΔ | ◇ |
| 159 | ++ | ++ | + | + | − | Δ | ΔΔ | ◇ |
| 161 | ++ | ++ | + | + | − | Δ | ΔΔ | ◇ |
| 162 | ++ | ++ | + | + | − | Δ | ΔΔ | ◇ |
| 163 | ++ | ++ | + | + | − | Δ | ΔΔ | ◇ |
| 286 | ++ | ++ | + | + | − | Δ | ΔΔ | ◇ |
| 287 | ++ | ++ | + | + | − | Δ | ΔΔ | ◇ |
| 289 | ++ | ++ | + | + | − | Δ | ΔΔ | ◇ |
| 290 | ++ | ++ | + | + | − | Δ | ΔΔ | ◇ |

Remarks ("++" refers to a good bacterial growth, "+" refers to a bacterial growth, "−" refers to bacterial non-growth, "ΔΔ" refers to a bacterial growth with good discoloration recognition, but poor sensitivity, "Δ" refers to a bacterial growth with good discoloration recognition, and good sensitivity, "◇" refers to a bacterial growth with good discoloration recognition, but poor sensitivity; the bacterial count of *H. pylori* is $1 \times 10^6$ CFU/mL).

TABLE 2

Effects of pH and $NiCl_2$ on *H. pylori* on Culture Medium

| Strains | pH | | | $NiCl_2$ (μmol/L) | | |
|---|---|---|---|---|---|---|
| | 7.15 | 7.25 | 7.35 | 1 | 10 | 100 |
| G27 | * | * | ** | + | + | ++ |
| 26695 | * | * | ** | + | + | ++ |
| 159 | * | * | ** | + | + | ++ |
| 161 | * | * | ** | + | + | ++ |
| 162 | * | * | ** | + | + | ++ |
| 163 | * | * | ** | + | + | ++ |
| 286 | * | * | ** | + | + | ++ |
| 287 | * | * | ** | + | + | ++ |
| 289 | * | * | ** | + | + | ++ |
| 290 | * | * | ** | + | + | ++ |

Remarks ("**" refers to a bacteria growth after 36 hours of culture, with an obvious discoloration; "*" refers to a good bacteria growth after 36 hours of culture, with a non-obvious discoloration; "+" refers to a good bacteria growth after 36 hours of culture, with a discoloration; "++" refers to a good bacteria growth after 36 hours of culture, with an obvious discoloration; the culture medium refers to 50 mL Colombian culture medium with 80 mg of urea and 0.4 mg of phenol red added; the bacterial count of *H. pylori* is $1 \times 10^6$ CFU/mL).

2.2 The Minimum Inhibitory Concentration (MIC) for Testing a Low Bacterial Count by Using a Micro Dilution Method (1) Preparation of medication solution: 4 mg/mL amoxicillin, 4 mg/mL clarithromycin, 4 mg/mL metronidazole, and 4 mg/mL levofloxacin are prepared separately for the subsequent use.

(2) MIC board preparation: 173.6 μL of culture medium is added to the first well firstly, 90 μL of culture medium is added to other wells, 6.4 μL of antibacterial drug is further added to the first hole, the dilution is doubled to the 11-th well; The 12-th well serves as a control for adding bacteria without drugs, with a retention of 90% μL culture medium.

(3) Preparation of bacterial solution: *H. pylori* grown in logarithmic phase on a solid plate is taken, BHI culture medium is used to prepare a bacterial suspension. The concentration of the bacterial solution is adjusted to $1 \times 10^8$ CFU/mL (OD600 is 0.3), diluted 10 times, 100 times, and 1000 times to implement a final concentration of $1 \times 10^6$ CFU/mL, $1 \times 10^6$ CFU/mL, $1 \times 10^4$ CFU/mL, for the subsequent use.

(4) Inoculation of bacterial solution: 10 μL of the above bacterial solution for the subsequent use is taken and added to wells the 1-10-th and the 12-th well (bacterial working concentration is $1 \times 10^6$ CFU/mL), the 11-th well serves as a non-bacterial control and only sterile water is added. The wells are cultivated for 72 hours to determine the results. The drug concentrations of 1-th to 10-th wells are 32 μg/mL, 16 μg/mL, 8 μg/mL, 4 μg/mL, 2 μg/mL, 1 μg/mL, 0.5 μg/mL, 0.25 μg/mL, 0.125 μg/mL and 0.0625 μg/mL, respectively.

(5) Results: when the bacterial count of standard sensitive strains G27 and 26695 is $1 \times 10^6$ CFU/mL, the MICs (in μg/mL) of levofloxacin, clarithromycin, metronidazole, and amoxicillin are 0.0625, 0.0312 to 0.0625, 0.25, 0.01562 to 0.0325, respectively; when the bacterial count of resistant strains 159, 161, 162, 163, 286, 287, 289, and 290 is $1 \times 10^6$ CFU/mL, the MICs (in μg/mL) of levofloxacin, clarithromycin, metronidazole, and amoxicillin are 0.5 to 32, 0.0625 to 8, 1 to 16, and 0.0625 to 2, respectively (see Table 3). But when the bacterial count is $1 \times 10^6$ CFU/mL, the stability of the MIC testing value is not good, and some results cannot be repeated; when the bacterial count is $1 \times 10^4$ CFU/mL, the stability of the testing value is poor, and the MIC of some strains cannot even be tested.

TABLE 3

The minimum inhibitory concentration (MIC) of H. pylori tested by the micro dilution method (unit: μg/mL)

| Strains | Bacterial count CFU/mL | Levo-floxacin | Clarith-romycin | Metroni-dazole | Amoxi-cillin |
|---|---|---|---|---|---|
| G27 | $10^6$ | 0.125 | 0.0625 | 0.5 | 0.03125 |
|  | $10^6$ | 0.0625 | 0.0312 | 0.5 | 0.01562 |
|  | $10^4$ | 0.0312 | 0.0156 | 0.125 | 0.00781 |
| 26695 | $10^6$ | 0.125 | 0.125 | 0.5 | 0.0625 |
|  | $10^6$ | 0.0625 | 0.0625 | 0.25 | 0.0325 |
|  | $10^4$ | 0.0312 | 0.0312 | 0.125 | 0.0325 |
| 159 | $10^6$ | 2 | 0.125 | 4 | 0.125 |
|  | $10^6$ | 1 | 0.0625 | 2 | 0.0625 |
|  | $10^4$ | 0.5 | 0.03125 | 0.5 | 0.03125 |
| 161 | $10^6$ | 2 | 2 | 4 | 0.125 |
|  | $10^6$ | 2 | 1 | 2 | 0.0625 |
|  | $10^4$ | 1 | 0.5 | 1 | 0.03125 |
| 162 | $10^6$ | 8 | 8 | 2 | 0.125 |
|  | $10^6$ | 4 | 4 | 1 | 0.0625 |
|  | $10^4$ | 2 | 1 | 0.5 | 0.03125 |
| 163 | $10^6$ | 16 | 0.5 | 16 | 1 |
|  | $10^6$ | 4 | 0.25 | 4 | 0.5 |
|  | $10^4$ | 2 | 0.125 | 2 | 0.25 |
| 286 | $10^6$ | 1 | 8 | 32 | 1 |
|  | $10^6$ | 0.5 | 4 | 16 | 0.5 |
|  | $10^4$ | 0.5 | 1 | 4 | 0.5 |
| 287 | $10^6$ | 4 | 4 | 32 | 0.25 |
|  | $10^6$ | 2 | 2 | 16 | 0.125 |
|  | $10^4$ | 1 | 8 | 8 | 0.0625 |
| 289 | $10^6$ | 8 | 32 | 32 | 1 |
|  | $10^6$ | 4 | 8 | 16 | 0.5 |
|  | $10^4$ | 2 | 2 | 8 | 0.125 |
| 290 | $10^6$ | 32 | 16 | 32 | 4 |
|  | $10^6$ | 32 | 4 | 16 | 2 |
|  | $10^4$ | 16 | 4 | 4 | 1 |

Remarks (when the bacterial count is $1 \times 10^6$ CFU/mL, the stability of the testing value is not good; when the bacterial count is $1 \times 10^4$ CFU/mL, the stability of the testing value is poor. In order to improve the stability, when the bacterial count is $1 \times 10^6$ CFU/mL, $1 \times 10^4$ CFU/mL, the calf serum of the culture medium used for MIC testing is increased from 10% to 15%.

count is $1 \times 10^6$ CFU/mL, the breakpoint of H. pylori resistance should also change by ¼ times to 1 times, namely, when the bacterial count of H. pylori is $1 \times 10^6$ CFU/mL, the resistance breakpoints to amoxicillin, clarithromycin, metronidazole, and levofloxacin are 0.125 g/mL to 0.5 μg/mL, 0.5 μg/mL to 2 μg/mL, 2 μg/mL to 8 μg/mL, and 0.5 μg/mL to 2 μg/mL, respectively.

2.4 The Verification of the Breakpoint of H. pylori Resistance When the Bacterial Count is $1 \times 10^6$ CFU/mL (1) Selective antibiotics addition: based on the obtained estimated values, the selective antibiotics amoxicillin, clarithromycin, metronidazole, and levofloxacin are added to the Columbia solid culture medium in gradients of ½ times, 1 times, and 2 times the estimated values. The plates are cooled and inverted for approximately 10 mL/piece, marked properly for the subsequent use.

(2) Preparation of bacterial solution: H. pylori grown in logarithmic phase on a solid plate is taken to prepare a bacterial suspension by using BHI. The concentration OD600 is adjusted to 0.3 ($1 \times 10^8$ CFU/mL), diluted 10 times for the subsequent use.

(3) Inoculation of bacterial solution: 10 μL of bacterial solution is taken and added to Columbia culture medium and the results are determined after cultivating for 72 hours.

(4) Result determination: the minimum drug concentration for no growth of bacteria on the plate is the minimum inhibitory concentration of the bacteria against the drug.

(5) Results: when levofloxacin is added at a concentration of 0.5 μg/mL, clarithromycin is added at a concentration of 0.5 μg/mL, metronidazole is added at a concentration of 4 μg/mL, and amoxicillin is added at a concentration of 0.5 μg/mL, no sensitive strain grows, and 90% of experimental resistant strains grow (see Table 4).

TABLE 4

Laboratory Strain Verification Additive Antibiotic Concentration (Unit: μg/mL)

| Strains | Levofloxacin | | | Clarithromycin | | | Metronidazole | | | Amoxicillin | | |
|---|---|---|---|---|---|---|---|---|---|---|---|---|
|  | 0.25 | 0.5 | 1 | 0.25 | 0.5 | 1 | 2 | 4 | 8 | 0.0313 | 0.0625 | 0.125 |
| G27 | + | − | − | + | − | − | + | − | − | + | − | − |
| 26695 | − | − | − | + | − | − | + | − | − | + | − | − |
| 159 | + | + | − | + | + | − | + | + | − | + | + | − |
| 161 | + | + | − | + | + | − | + | + | − | + | + | − |
| 162 | + | + | − | + | + | − | + | − | − | + | − | − |
| 163 | + | + | − | − | − | − | + | + | − | + | + | − |
| 286 | + | + | − | + | + | − | + | + | − | − | + | − |
| 287 | + | + | − | + | + | − | + | + | − | + | + | + |
| 289 | + | + | + | + | + | + | + | + | − | + | + | − |
| 290 | + | + | + | + | + | − | + | + | + | + | + | − |

Remarks ("+" represents there is a growth of bacterial, "−" represents there is no growth of bacterial).

2.3 The Estimation of the Breakpoints that H. pylori Produces Resistance When Bacterial Count is $1 \times 10^6$ CFU/mL According to the drug sensitivity results in Table 3, it is found that among the existing strains in the laboratory, when the bacterial count decreases from $1 \times 10^6$ CFU/mL to $1 \times 10^6$ CFU/mL, the measured MIC values of H. pylori to amoxicillin, clarithromycin, metronidazole, and levofloxacin vary by approximately ¼ times to 1 times. According to CLSI guidelines, when the bacterial count is $1 \times 10^6$ CFU/mL, the resistance breakpoints of H. pylori to these four drugs are 0.5 μg/mL, 2 μg/mL, 8 μg/mL, and 2 μg/mL, respectively. Correspondingly, it is estimated that when the bacterial (5) Conclusion: the optimal concentration for adding antibiotics is 0.5 μg/mL of levofloxacin, 0.5 μg/mL of clarithromycin, 4 μg/mL of metronidazole, and 0.0625 μg/mL of amoxicillin.

2.5 The Verification of the Concentration of Antibiotics Added to the Characteristic Culture Medium (1) Preparation of antibacterial solution: the amoxicillin, clarithromycin, metronidazole, and levofloxacin are each prepared at a concentration of 4 mg/mL.

(2) The addition of antibacterial drugs to solid plates: 0.5 μg/mL of levofloxacin, 0.5 μg/mL of clarithromycin, 4

μg/mL of metronidazole, and 0.0625 μg/mL of amoxicillin are added to Columbia culture medium and the characteristic culture medium, respectively.

(3) Preparation of bacterial solution: *H. pylori* grown in logarithmic phase on a solid plate is taken to prepare a bacterial suspension by using BHI, and the concentration OD600 is adjusted to 0.3 ($1 \times 10^8$ CFU/mL), diluted 10 times for the subsequent use.

(4) Inoculation of bacterial solution: 10 μL of bacterial solution is taken and added dropwise to the characteristic culture medium and the results are determined after cultivating for 36 hours.

(5) Results: the results shows good consistency between the addition of antibiotics to Columbia culture medium and the addition of antibiotics to the characteristic culture medium.

the bacteria have resistance is determined based on the discoloration of the characteristic culture medium.

Figure 4:
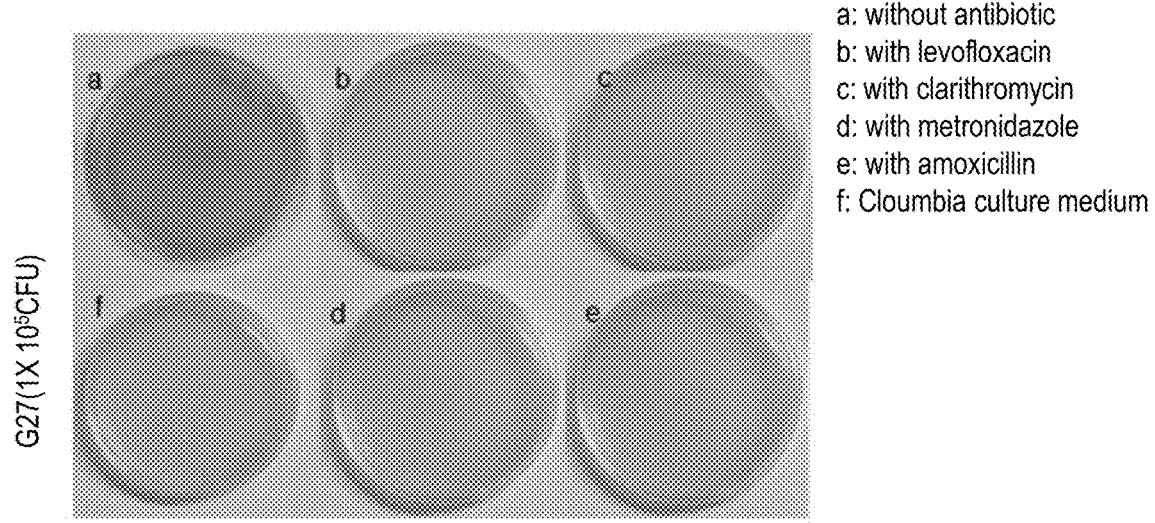
FIG. 4 illustrates a discoloration reaction of *H. pylori* strain G27 partially coated on a characteristic culture medium and cultivated for 36 hours, when *H. pylori* strain G27 has a bacterial count of $1\times10^6$ CFU.

(4) Results: *H. pylori* G27 strain with the bacterial count of $1 \times 10^6$ CFU/mL is cultivated on a characteristic culture medium without antibiotics for 36 hours, resulting in that the culture medium turns red locally; the colour on a characteristic culture medium containing antibiotics (amoxicillin, clarithromycin, metronidazole, levofloxacin) do not change basically, it is determined that *H. pylori* G27 strain does not develop resistance to these four antibiotics (as illustrated in FIG. 4). *H. pylori* 286, 287, and 289 strains with the bacterial count of $1 \times 10^6$ CFU/mL is cultivated on a characteristic culture medium without antibiotics for 36 hours, resulting in that the culture medium locally turns red; the characteristic culture medium containing antibiotics (amoxicillin, clarithromycin, metronidazole, levofloxacin) also turns red, it is

TABLE 5

Growth of *H. pylori* when antibiotics (Unit μg/mL) are added to characteristic solid culture medium

| | Columbia culture medium | | | | Characteristic culture medium | | | |
|---|---|---|---|---|---|---|---|---|
| Strains | Levofloxacin 0.5 | Clarithromycin 0.5 | Metronidazole 4 | Amoxicillin 0.0625 | Levofloxacin 0.5 | Clarithromycin 0.5 | Metronidazole 4 | Amoxicillin 0.0625 |
| G27 | − | − | − | − | x | x | x | x |
| 26695 | − | − | − | − | x | x | x | x |
| 159 | + | + | + | + | * | * | * | * |
| 161 | + | + | + | + | * | * | * | * |
| 162 | + | + | + | + | * | * | * | * |
| 163 | + | + | + | + | * | * | * | * |
| 286 | + | + | + | + | * | * | * | * |
| 287 | + | + | + | + | * | * | * | * |
| 289 | + | + | + | + | * | * | * | * |
| 290 | + | + | + | + | * | * | * | * |

Remarks: ("+" refers to a growth of *H. pylori*; "−" refers to non-growth of *H. pylori*; "x" refers to non-growth of *H. pylori* and no change in the color of the culture medium after 72 hours of culture; "*" refers to a color change of the culture medium after 36 hours of culture and a growth of *H. pylori* after 72 hours of culture.)

(6) Conclusion: in the final components of solid culture medium of a 100 mL system, Colombian culture medium is 4 g, calf serum is 14 mL, urea is 160 mg, *H. pylori* selective additive is 1 mL, phenol red is 8 mg, nickel chloride is 10 μmol, and the pH is adjusted to 7.35; the composition of antibiotics added for drug resistance testing is: 0.5 μg/mL of levofloxacin, 0.5 μg/mL of clarithromycin, 4 μg/mL of metronidazole, and 0.0625 μg/mL of amoxicillin. The specific preparation method is as described in Example 1.

2.6 Drug Resistance Testing of Laboratory Strains in the Present Invention (1) Preparation of bacterial solution: *H. pylori* grown in logarithmic phase on a solid plate is taken to prepare a bacterial suspension by using BHI, and the concentration OD600 is adjusted to 0.3 ($1 \times 10^8$ CFU/mL), diluted 10 times for the subsequent use.

(2) Inoculation of bacterial solution: 10 μL bacterial solution is taken and added dropwise onto a characteristic culture medium with 5 pieces (ABCDE) in total. A is the characteristic culture medium without antibiotics, B is the characteristic culture medium containing levofloxacin, C is the characteristic culture medium containing clarithromycin, D is the characteristic culture medium containing metronidazole, and E is the characteristic culture medium containing amoxicillin; another 100 μL bacterial solution is taken and applied to Columbia culture medium and coated on a plate.

Figure 5:
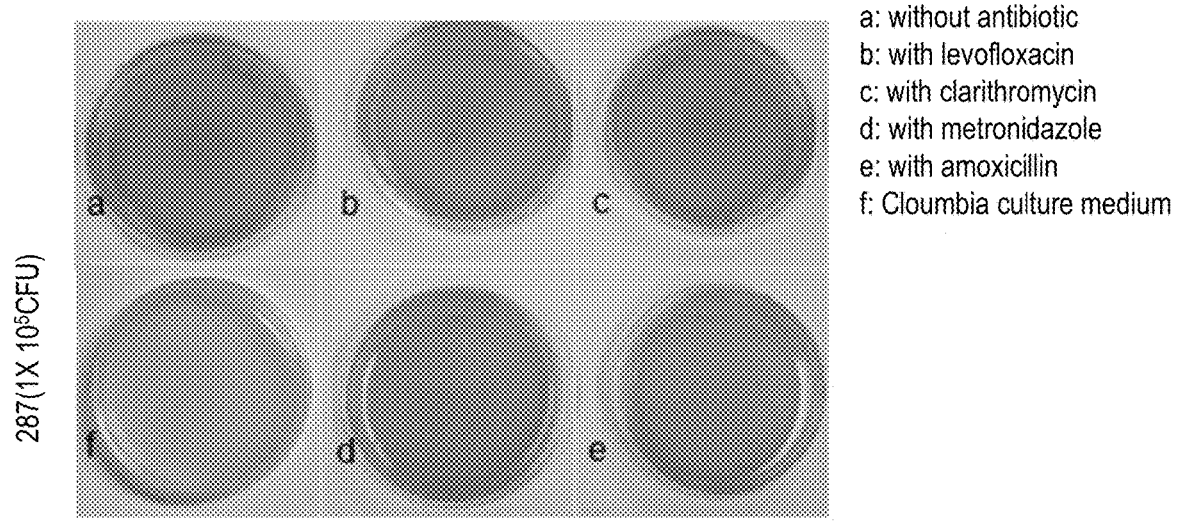
FIG. 5 illustrates a discoloration reaction of *H. pylori* strain 287 partially coated on the characteristic culture medium and cultivated for 36 hours, when *H. pylori* strain 287 has a bacterial count of $1\times10^6$ CFU
Figure 6:
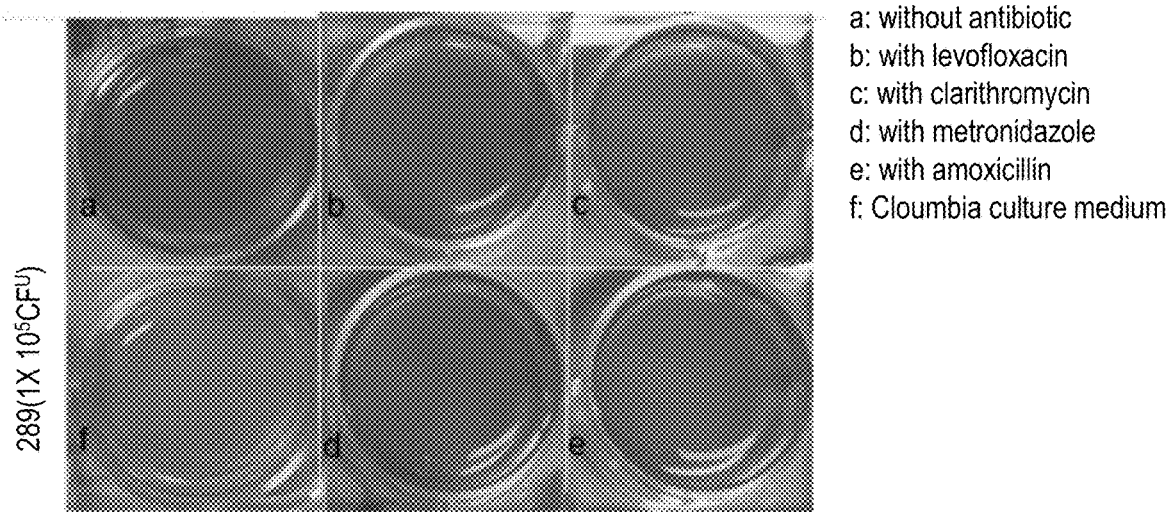
FIG. 6 illustrates a discoloration reaction of *H. pylori* strain 289 partially coated on the characteristic culture medium and cultivated for 36 hours, when *H. pylori* strain 289 has a bacterial count of $1\times10^6$ CFU.
Figure 7:
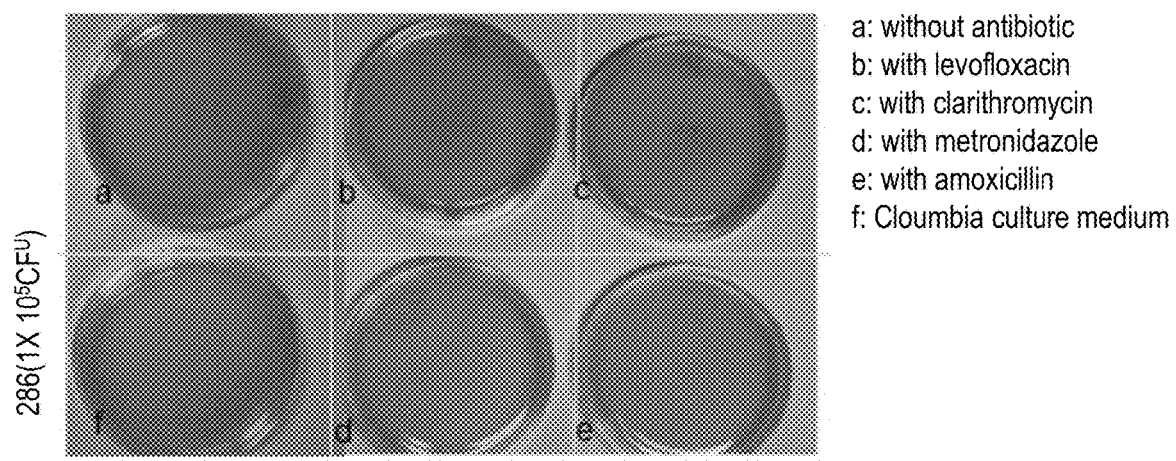
FIG. 7 illustrates a discoloration reaction of *H. pylori* strain 286 partially coated on the characteristic culture medium and cultivated for 36 hours, when *H. pylori* strain 286 has a bacterial count of $1\times10^6$ CFU.
Figure 8:
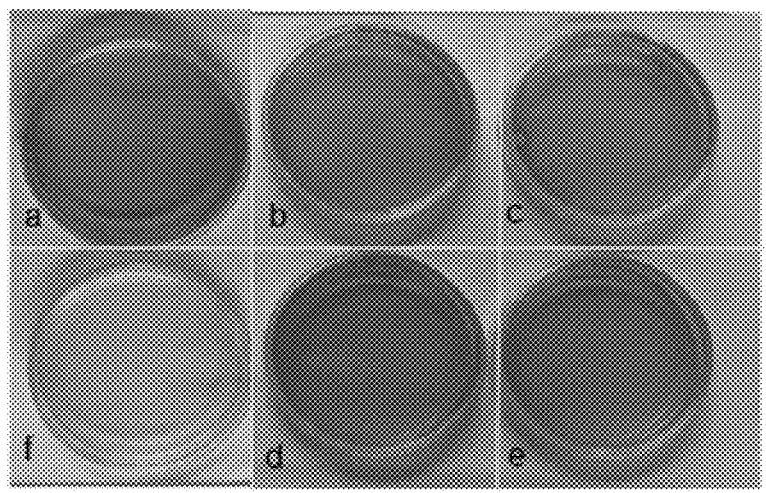
FIG. 8 illustrates a discoloration reaction of *H. pylori* strain 159 partially coated on the characteristic culture medium and cultivated for 36 hours, when *H. pylori* strain 159 has a bacterial count of $1\times10^6$ CFU.

(3) Culture: all plates are moved to a three gas incubator and cultivated at 37° C. for 36 hours. After being taken out and placed in a natural environment for 30 minutes, whether determined that *H. pylori* 286, 287, and 289 strains have developed resistance to these four antibiotics (as illustrated in FIGS. 5, 6, and 7). *H. pylori* 159 strain with the bacterial count of $1 \times 10^6$ CFU/mL is cultivated on a characteristic culture medium without antibiotics for 36 hours, resulting in that the culture medium locally turns red; the color on the characteristic culture media containing clarithromycin, metronidazole, and levofloxacin changes basically, whereas the color on the characteristic culture media containing amoxicillin does not change basically, which is determined to have developed resistance to clarithromycin, metronidazole, and levofloxacin and is sensitive to amoxicillin (as illustrated in FIG. 8). The determination results of all characteristic culture media are consistent with the conclusion of the micro dilution method for testing MIC (Table 3).

(5) Conclusion: the drug resistance testing of laboratory strains by the present invention is consistent with the drug resistance conclusion determined by the micro dilution method.

2.7 Drug Resistance Testing of Clinical Specimens Using the Method of the Present Invention (1) Transfer liquid preparation: after sterilization and cooling, BHI culture medium is added with 10% calf serum, followed by 30% glycerol to prepare *H. pylori* preservation solution. On this basis, 1% *H. pylori* selective additive is added to prepare the transfer liquid. 1 mL of transfer solution is taken into a sterile EP tube, and 6-8 sterilized small steel balls are poured into the EP tube for the subsequent use.

(2) Clinical specimen selection: patient cases that have not used antibiotics or other drugs recently or have stopped using antibiotics for 4 weeks or stopped using proton pump inhibitors for 2 weeks are selected, the patient's informed consent is obtained and an informed consent form is signed.

(3) Specimen acquisition: a biopsy tissue group is obtained from the gastric antrum and a small curvature side of the gastric body through a gastroscopy biopsy passage and placed into an EP tube (strictly sterile operation). The biopsy tissue is placed on the ice surface and transferred as soon as possible (within 2 hours) to complete the subsequent steps.

(4) Preparation of bacterial solution containing tissue: the EP tube containing tissue is placed in a homogenizer at 300 hz and crushed for 5 minutes, transferred to another EP, centrifuged at 12000 rpm for 2 minutes, the supernatant is discarded, BHI is resuspended to 200 μL, and a bacterial suspension is prepared for the subsequent use.

(5) Inoculation of bacterial solution: 10 μL of bacterial solution is taken and added dropwise to the characteristic culture medium (5 pieces in total). The characteristic culture medium is removed after cultivating in a three gas incubator at 37° C. for 36 hours, and the results are determined after leaving for 30 minutes; another 100 μL is taken and coated onto Colombian culture medium for the traditional bacterial culture.

Figure 13:
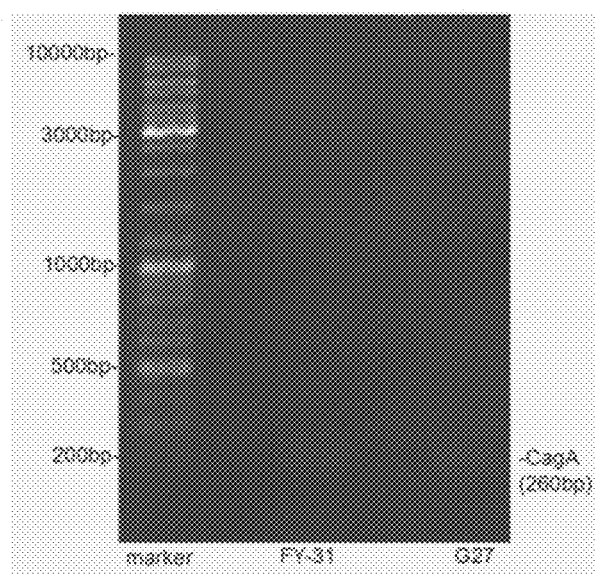
FIG. 13 illustrates an electrophoretic diagram of PCR products to verify the CagA gene (↙ at 260 bp) of clinical *H. pylori* strain FY-31.

(6) Testing on MIC of clinical strains by using the traditional bacterial culture and the micro dilution method: 1 mg/mL solution of amoxicillin, clarithromycin, metronidazole, and levofloxacin is prepared. *H. pylori* single colony grown on Colombian culture medium is taken (which is confirmed as *H. pylori* by urease, oxidase, catalase, and PCR testing of CagA gene, as illustrated in FIG. 13) and the bacteria are increased. During the preparation of MIC plates and bacterial solution, *H. pylori* with logarithmic growth phase is taken to prepare a bacterial suspension by using BHI. The concentration OD600 is adjusted to 0.3 ($1 \times 10^8$ CFU/mL, diluted 10 times, 10 μL is taken and added to wells 1-8 (with a bacterial solution concentration of approximately $1.0 \times 10^6$ CFU/mL per well, cultivated for 72 hours to determine the results.

Figure 9:
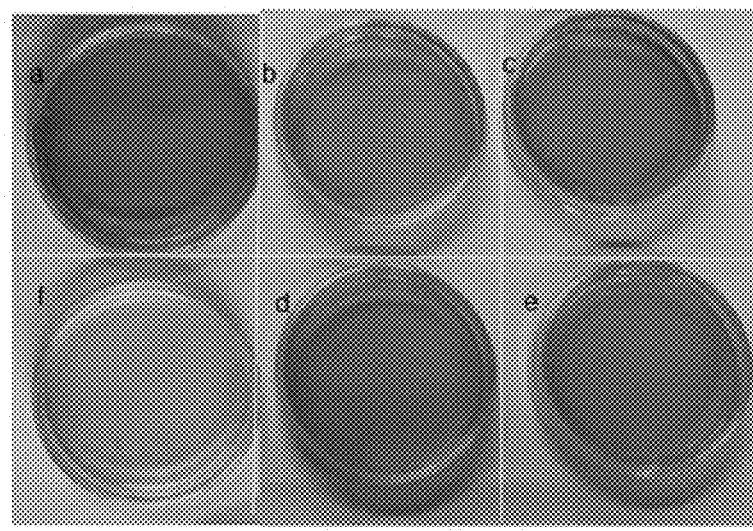
FIG. 9 illustrates a discoloration reaction effect of clinical *H. pylori* strain FY-31 cultivated on the characteristic culture medium for 36 hours.
Figure 10:
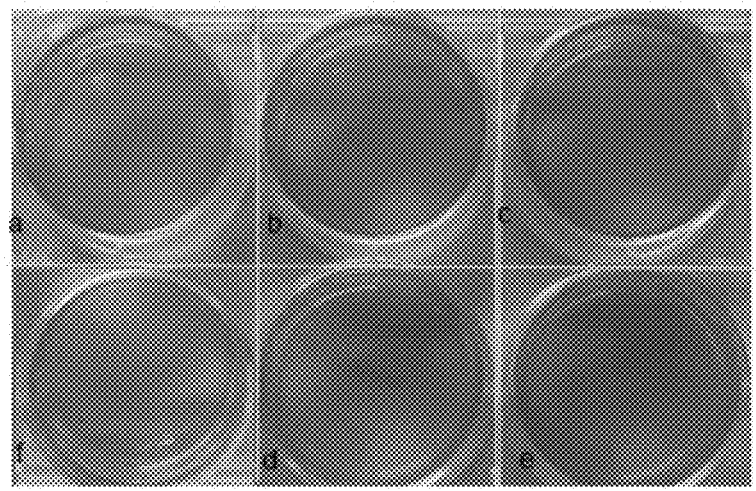
FIG. 10 illustrates a discoloration reaction effect of clinical *H. pylori* strain FY-43 cultivated on the characteristic culture medium for 36 hours.
Figure 11:
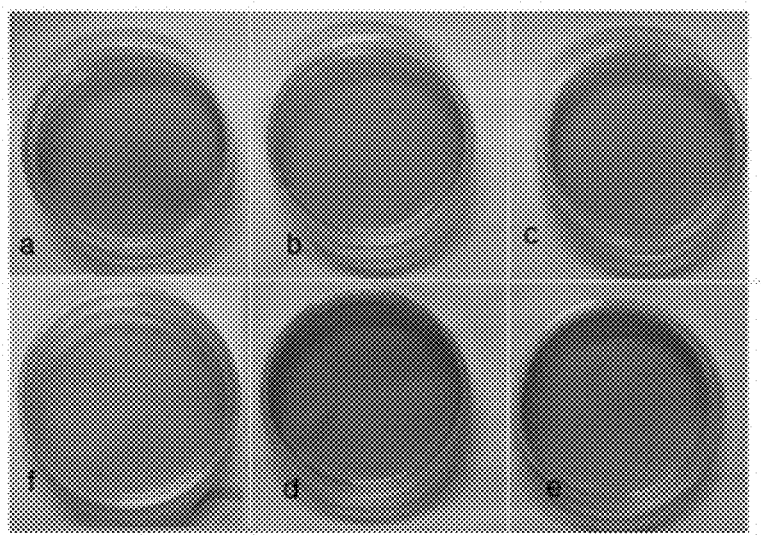
FIG. 11 illustrates a discoloration reaction effect of clinical *H. pylori* strain FY-44 cultivated on the characteristic culture medium for 36 hours.
Figure 12:
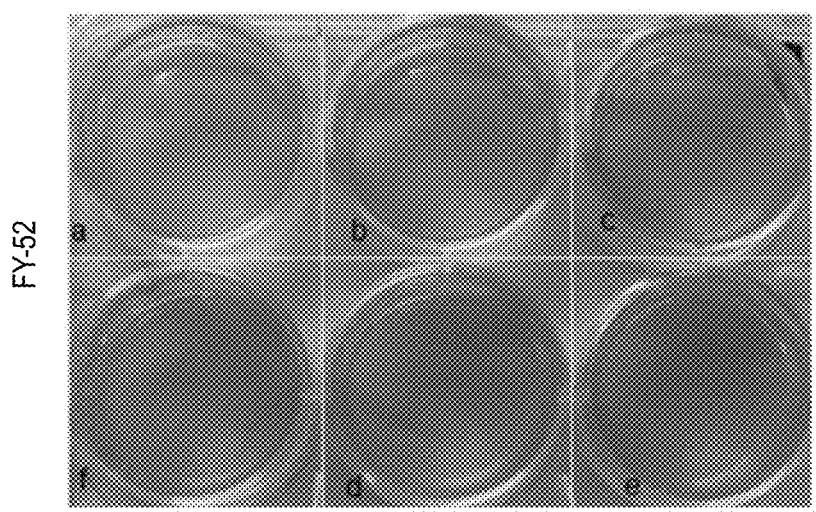
FIG. 12 illustrates a discoloration reaction effect of clinical *H. pylori* strain FY-52 cultivated on the characteristic culture medium for 36 hours.

(7) Results: the clinical *H. pylori* strain FY-31 is resistant to levofloxacin and sensitive to amoxicillin, clarithromycin, and metronidazole (as illustrated in FIG. 9); clinical *H. pylori* strain FY-47 is resistant to metronidazole and sensitive to amoxicillin, clarithromycin, and levofloxacin (as illustrated in FIG. 10); clinical *H. pylori* strains FY-43 and FY-52 are sensitive to amoxicillin, clarithromycin, metronidazole, and levofloxacin, (as illustrated in FIGS. 11 and 12). The determination results of all characteristic culture media are consistent with the conclusion of the micro dilution method for testing MIC (Table 6).

TABLE 6

Testing of Clinical *H. pylori* Strain
MIC by Microdilution Method (Unit: μg/mL)

| Strain | Levofloxacin | Clarithromycin | Metronidazole | Amoxicillin |
|---|---|---|---|---|
| FY-31 | 16 | 0.0625 | 1 | 0.03125 |
| FY-43 | 1 | 0.125 | 0.5 | 0.03125 |
| FY-47 | 0.5 | 0.0625 | 16 | 0.03125 |
| FY-52 | 0.25 | 0.25 | 1 | <0.03125 |

(8) Conclusion: the drug resistance test results of the present invention for different strains are consistent with the conclusion of using micro dilution method to determine the drug resistance of *H. pylori*.

What is claimed is:

1. A culture medium for testing drug resistance of *H. pylori*, wherein a composition of the culture medium is based on a Columbia culture medium, with an addition of calf serum accounting for 10 wt. % to 15 wt. % of the culture medium, 1.2 mg/mL to 2.4 mg/ml of urea, 0.004 mg/mL to 0.016 mg/mL of phenol red, 10 μmol/L to 100 μmol/L of nickel chloride and *H. pylori* selective additive (Dent, SR0147E) accounting for 1% of a total volume of the culture medium, and meanwhile antibiotics for testing drug resistance are added, and a pH value is adjusted to 7.15 to 7.35.

2. The culture medium according to claim 1, wherein the composition that the Columbia culture medium is 4 g, calf serum is 14 mL, urea is 160 mg, *H. pylori* selective additive (Dent, SR0147E) is 1 mL, phenol red is 0.8 mg, and nickel chloride is 10 μmol, is added by sterile water to form a 100 mL system, and a pH regulator is a 5 wt. % sodium hydroxide solution.

3. The culture medium according to claim 1, wherein the antibiotics are 0.5 μg/mL levofloxacin, 0.5 μg/mL clarithromycin, 4 μg/mL metronidazole, or 0.0625 μg/mL amoxicillin.

4. The culture medium according to claim 2, wherein the pH value of the culture medium is 7.35.

5. A method for preparing the culture medium according to claim 1, wherein steps are that: weighing the Columbia culture medium, adding pure water, cooling to 50° C. naturally after autoclave sterilization, adding calf serum, 20 wt. % sterile urea solution, *H. pylori* selective additive (Dent, SR0147E), 0.2 wt. % phenol red solution, nickel chloride, adjusting the pH of the culture medium to 7.35 by using a 5 wt. % sodium hydroxide solution titration method, then adding resistance testing antibiotics, and inverting a plate before the culture medium coagulates, with 10 mL/piece.

6. A method of using the culture media according to claim 1, comprising: providing the culture media to test drug resistance of *H. pylori*.

\* \* \* \* \*